(12) United States Patent  
Fuerst

(10) Patent No.: US 7,997,009 B2
(45) Date of Patent: *Aug. 16, 2011

(54) FOOTWEAR HAVING AN ENCLOSED AND ARTICULATED TOE

(75) Inventor: Rory W. Fuerst, Atherton, CA (US)

(73) Assignee: Keen, Inc., Portland, OR (US)

( * ) Notice: Subject to any disclaimer, the term of this patent is extended or adjusted under 35 U.S.C. 154(b) by 76 days.

This patent is subject to a terminal disclaimer.

(21) Appl. No.: 12/416,688

(22) Filed: Apr. 1, 2009

(65) Prior Publication Data

US 2009/0265955 A1 Oct. 29, 2009

Related U.S. Application Data

(63) Continuation of application No. 10/897,998, filed on Jul. 22, 2004, now Pat. No. 7,513,064.

(60) Provisional application No. 60/489,468, filed on Jul. 22, 2003.

(51) Int. Cl.
*A43B 3/12* (2006.01)

(52) U.S. Cl. ............................. 36/11.5; 36/102; 36/77 R

(58) Field of Classification Search ............... 36/4, 11.5, 36/8.1, 88, 102, 103, 32 R, 25 R, 77 R
See application file for complete search history.

(56) References Cited

U.S. PATENT DOCUMENTS

| | | | |
|---|---|---|---|
| 114,340 A | 5/1871 | Prusha et al. | |
| 1,053,442 A | 2/1913 | Rouse | |
| 1,205,983 A | 11/1916 | Emmerth | |
| 1,386,028 A | 8/1921 | Roe | |
| D77,029 S | 11/1928 | Richter et al. | |
| 1,769,328 A | 7/1930 | Auster | |
| 1,773,127 A | 8/1930 | Auster | |
| 1,803,554 A | 5/1931 | Knilans | |
| 1,964,705 A | 6/1934 | Pellkofer | |
| 2,048,185 A | 7/1936 | Dorogi et al. | |
| 2,093,908 A | 9/1937 | Dodge | |
| 2,110,839 A | 3/1938 | Ferriot | |
| 2,185,762 A | 1/1940 | Cox | |
| 2,193,943 A | 3/1940 | Shea | |
| 2,229,387 A | 1/1941 | Parker | |
| 2,231,988 A | 2/1941 | Catania | |
| 2,239,206 A | 4/1941 | Tietig | |

(Continued)

FOREIGN PATENT DOCUMENTS

DE 3940522 6/1991

(Continued)

OTHER PUBLICATIONS

ISA Europe. International Search Report of PCT/US2004/023967. Dec. 6, 2004. EPO.

(Continued)

*Primary Examiner* — Marie Patterson
(74) *Attorney, Agent, or Firm* — Alleman Hall McCoy Russell & Tuttle LLP

(57) ABSTRACT

Articles of footwear having an enclosed articulated toe portion, including a molded midsole with an integrally-molded toe cap shaped to receive a foot therein and to enclose the toes of the foot. The toe cap terminates at a position adjacent to the base of the toes of the foot. The articles additionally include an outsole affixed to the bottom of the midsole and an upper which in some embodiments is co-molded with the midsole and toe cap.

34 Claims, 5 Drawing Sheets

U.S. PATENT DOCUMENTS

| | | | |
|---|---|---|---|
| 2,283,273 A | 5/1942 | Marcy |
| 2,297,595 A | 9/1942 | Weinstat |
| 2,317,870 A | 4/1943 | Weinstat |
| 2,327,322 A | 8/1943 | Slater |
| 2,468,573 A | 4/1949 | Rimer |
| D158,653 S | 5/1950 | Fenlason |
| 2,583,826 A | 1/1952 | Fischer |
| 2,590,648 A | 3/1952 | Pitz |
| 2,669,036 A | 2/1954 | Isreal |
| D172,251 S | 5/1954 | Salmeri |
| 2,773,317 A | 12/1956 | Helle |
| 2,981,010 A | 4/1961 | Aaskov |
| 3,605,292 A | 9/1971 | Goldblatt |
| 3,613,272 A | 10/1971 | Fukuoka |
| 3,742,625 A | 7/1973 | Famolare, Jr. |
| 3,834,377 A | 9/1974 | Lebold |
| 3,858,336 A | 1/1975 | Brown |
| 3,906,642 A | 9/1975 | Cohen |
| 4,051,612 A | 10/1977 | Damron |
| 4,072,461 A | 2/1978 | Pirk |
| 4,132,016 A | 1/1979 | Vaccari |
| 4,177,583 A | 12/1979 | Chapman |
| 4,290,212 A | 9/1981 | Matsson |
| 4,400,894 A | 8/1983 | Ehrlich |
| 4,535,554 A | 8/1985 | DeObaldia |
| D282,022 S | 1/1986 | Wright |
| 4,573,457 A | 3/1986 | Parks |
| 4,735,003 A | 4/1988 | Dykeman |
| 4,742,625 A | 5/1988 | Sydor et al. |
| 4,862,606 A | 9/1989 | Siskind et al. |
| 4,924,606 A | 5/1990 | Montgomery et al. |
| D316,772 S | 5/1991 | Rose |
| D322,353 S | 12/1991 | Bennett |
| 5,111,597 A | 5/1992 | Hansen et al. |
| 5,285,583 A | 2/1994 | Aleven |
| 5,315,767 A | 5/1994 | Bradbury |
| 5,331,751 A | 7/1994 | Harwood |
| 5,469,638 A | 11/1995 | Crawford, III |
| 5,481,814 A | 1/1996 | Spencer |
| D373,674 S | 9/1996 | Dolinsky |
| D389,293 S | 1/1998 | Crowley |
| D389,993 S | 2/1998 | Ryan |
| D397,544 S | 9/1998 | Egelja |
| D397,545 S | 9/1998 | Davidowitz et al. |
| 5,832,633 A | 11/1998 | Wang |
| 5,836,090 A | 11/1998 | Smith |
| 5,862,614 A | 1/1999 | Koh |
| 5,901,394 A | 5/1999 | Greenawalt |
| D412,777 S | 8/1999 | Norton et al. |
| D425,292 S | 5/2000 | Matis |
| 6,065,230 A | 5/2000 | James |
| D428,691 S | 8/2000 | Matis |
| 6,122,845 A | 9/2000 | Menghi |
| D431,350 S | 10/2000 | Matis et al. |
| D440,034 S | 4/2001 | Matis |
| D440,754 S | 4/2001 | Bathum |
| 6,237,249 B1 | 5/2001 | Aguerre |
| D443,976 S | 6/2001 | Davidowitz et al. |
| D449,153 S | 10/2001 | Rork et al. |
| 6,298,583 B1 | 10/2001 | Allen |
| 6,367,170 B1 | 4/2002 | Williams |
| 6,412,195 B1 | 7/2002 | Mack et al. |
| 6,493,965 B1 | 12/2002 | Bathum |
| 6,505,424 B2 | 1/2003 | Oorei et al. |
| D472,039 S | 3/2003 | Schroeder et al. |
| D473,046 S | 4/2003 | Schroeder et al. |
| D474,004 S | 5/2003 | Kuerbis |
| 6,598,323 B1 | 7/2003 | Gougelet et al. |
| D489,524 S | 5/2004 | Bathum |
| D492,096 S | 6/2004 | Sanchez et al. |
| 6,746,027 B1 | 6/2004 | Soo |
| D495,476 S | 9/2004 | Recchi |
| D496,523 S | 9/2004 | Fuerst |
| D498,575 S | 11/2004 | Fuerst |
| 6,907,681 B2 | 6/2005 | Tanaka et al. |
| 6,948,261 B1 | 9/2005 | Grasso |
| D517,306 S | 3/2006 | Hoeft |
| D519,271 S | 4/2006 | Hoeft |
| D520,723 S | 5/2006 | Hoeft |
| D528,758 S | 9/2006 | Keen |
| D530,492 S | 10/2006 | McClaskie |
| D533,337 S | 12/2006 | Keen |
| D534,719 S | 1/2007 | Keen |
| 7,171,768 B2 | 2/2007 | Klein |
| D538,522 S | 3/2007 | Keen |
| 7,234,251 B2 | 6/2007 | Fuerst et al. |
| D546,048 S | 7/2007 | Keen |
| 7,287,342 B2 | 10/2007 | Keen |
| 7,290,356 B2 | 11/2007 | Fuerst |
| 7,320,189 B2 | 1/2008 | Clark et al. |
| D564,204 S | 3/2008 | Seamans |
| D564,206 S | 3/2008 | Seamans |
| 7,347,012 B2 | 3/2008 | Clark et al. |
| 7,513,064 B2 * | 4/2009 | Fuerst ............................ 36/11.5 |
| 2003/0121181 A1 | 7/2003 | Chang |
| 2004/0128863 A1 | 7/2004 | Hong et al. |
| 2004/0194342 A1 | 10/2004 | Steinberg |
| 2005/0060914 A1 | 3/2005 | Fuerst |
| 2005/0235527 A1 | 10/2005 | Perron, Jr. |
| 2005/0268484 A1 | 12/2005 | Dombowsky |
| 2007/0011910 A1 | 1/2007 | Keen |
| 2007/0011914 A1 | 1/2007 | Keen et al. |
| 2007/0180730 A1 | 8/2007 | Greene et al. |
| 2008/0047165 A1 | 2/2008 | Keen |

FOREIGN PATENT DOCUMENTS

| | | |
|---|---|---|
| DE | 20107343 | 7/2001 |
| EP | 1459874 | 9/2004 |
| FR | 718801 | 1/1932 |
| FR | 2478442 | 9/1981 |
| GB | 138623 | 7/1920 |

OTHER PUBLICATIONS

ISA Europe. European Search Report of EP 04 00 5579. Jun. 24, 2004. EPO.

* cited by examiner

FOOTWEAR HAVING AN ENCLOSED AND ARTICULATED TOE

CROSS-REFERENCE TO RELATED PATENT APPLICATIONS

This application is a continuation of U.S. patent application Ser. No. 10/897,998 filed on Jul. 22, 2004 now U.S. Pat. No. 7,513,064, which is related to and claims the benefit of U.S. Provisional Application Ser. No. 60/489,468 filed on Jul. 22, 2003. Each of these applications is hereby incorporated by reference in their entirety.

BACKGROUND OF THE INVENTION

Footwear can be constructed with simple or complex structures. Simple "flip flop" sandals can be formed of a one piece sole cut from foamed rubber or plastic sheet stock with one or two straps attached to hold the sole to the wearer's foot. Other sandals can be formed with a one or two layer sole and again one or more simple straps. Clogs and the like can be formed with a one piece molded or carved sole, in some cases with the carving or molding extended to create an integral "upper" which can serve to affix the sole to the wearer's foot. Molded and carved clogs and like items of footwear are commonly extremely rigid and inflexible.

More complex footwear constructions often involve an outsole which in use contacts the ground, and an insole, which contacts the sole of the wearer's foot and often a midsole located between the outsole and insole to provide shape and structure to the footwear item. One or more straps and/or an upper are affixed to the sole as just described. This more complicated sole construction is more expensive and in certain settings relatively inflexible and not particularly comfortable but offers advantages of providing a defined structure to the article while being relatively adaptable to the wearer's feet.

A variety of United States patents describe footwear articles and the materials and configurations of their construction. These patents include, for example, the following: U.S. Pat. No. 1,053,442, issued Feb. 18, 1913 to Rouse; U.S. Pat. No. 1,964,705 issued Jun. 26, 1934 to Pellhofer; U.S. Pat. No. 2,590,648 issued Mar. 25, 1952 to Pitz; U.S. Pat. No. 4,290,212 issued Sep. 22, 1981 to Matsson; U.S. Pat. No. 4,400,894, issued Aug. 30, 1983 to Ehrlich; U.S. Pat. No. 4,573,457 issued Mar. 4, 1986 to Parks; and U.S. Pat. No. 6,065,230 issued May 23, 2000 to James each of which discloses articles of footwear which have a sole rendered flexible by one or more joints located in the ball of the foot region. Other United States patents of interest include the following: U.S. Pat. No. 2,669,036 issued Feb. 16, 1954 to Isreal; U.S. Pat. No. 5,481,814 issued Jan. 9, 1996 to Spencer and U.S. Pat. No. 3,742,625 issued Jul. 3, 1973 to Famolare each of which shows articles of footwear having a bendable joint in the mid arch region.

SUMMARY OF THE INVENTION

The present invention provides a construction for articles of footwear which is quite simple and adaptable and which gives rise to a high degree of flexibility. These articles of footwear are characterized by having a molded midsole which includes integrally molded therewith a toe cap which extends up and over the area occupied by its wearer's toes when being warn. This toe cap and the area of the midsole with which it is associated form a toe portion of the article of footwear which is articulated from the remainder of the upper of the article and extends back over the top of the toes and terminates at a position adjacent to the base of the wearer's toes.

The present invention provides an article of footwear such as a sandal, a shoe or a clog having an enclosed articulated toe portion. It comprises a one-piece block of molded material making up an midsole and an integrally-molded toe cap or toe piece together shaped to receive a foot therein and to enclose the toes of the foot. The toe cap that makes up a top surface of the block of material terminates at a position adjacent to the base of the toes of the foot. There is an outsole, most commonly a rubber outsole, attached to the bottom of the molded midsole.

In various optional preferred aspects, the enclosed toe portion is articulated from the remainder of the footwear article by being bendable along a transverse slot passing across the midsole. Such transverse slot is preferably located adjacent (and above) the base of the toes of the foot. In this aspect of the invention, the article includes an upper, the front edge of which, together with the rear edge of the toe cap, defines the transverse slot. In preferred embodiments, such an article is a clog having an upper portion crossing above the wearer's foot and an open back end. Alternatively, this article can take the form of a shoe in which the heel area is additionally partially enclosed. In the clog embodiment and the like, it is possible and generally desirable to form the upper from the same material as the midsole and to form the upper by molding during the midsole and toe cap molding step.

In alternate optional preferred aspects, the articulated enclosed toe portion is formed by an upper end of the enclosed toe portion terminating at a position adjacent (and above) the base of the toes of the foot. In this aspect of the invention, an optional harness is mounted on top of the block of material. The harness is preferably laced, but may also comprise elastic straps or netting.

In preferred aspects, the one-piece midsole-toe cap-(and, if present, the optional co-molded upper) may be injection molded preferably from foams made from ethylene-vinyl-acetate, or a combination of rubber and ethylene-vinyl-acetate, or polyurethane. These plastics are merely representative and other tough but lightweight and flexible plastic materials can be used, if desired.

An advantage of using these lightweight plastic materials is that the midsole, toe cap and upper may be formed very inexpensively.

Additional advantages of these materials include the fact that they are waterproof and that they float. This is especially beneficial when using the present shoes, clogs or sandals on the beach, boat or dock.

In optional preferred aspects, the present invention provides footwear having an articulated toe portion. Such an articulated toe portion is especially beneficial in providing ease of motion in a one-piece molded construction. In optional preferred aspects, the articulated toe portion may be formed at least partially by the transverse slot across the of the midsole and between the upper and the toe cap (preferably directly above the base of the toes). The articulated toe portion may also be formed by an optional raised transverse ridge on the top of the midsole. In preferred aspects, the raised transverse ridge is positioned to pass under the base of the toes of the foot. In preferred aspects, the raised transverse ridge is positioned to pass under the transverse slot.

The outsole of the footwear article may optionally be made of a first portion attached forward of the transverse slot, and a second portion attached rearward of the transverse slot. Alternatively, the outsole may be made of first, second and third portions. These portions may be separate from one another, or they may be linked together. When separate one another, these portions are preferably disposed on either side of a location under the base of the wearer's toes (under the transverse slot, or under the top end of the block of material above the base of the user's shoes). When linked together, these portions are preferably connected to one another by a flexible portion that is similarly disposed at a location under the base of the user's toes (e.g. under the transverse slot, or under the rear end of the toe piece.

In preferred aspects, the most rearward portion of the outsole (i.e., the portion that corresponds to the heel of the shoe) may be made of a longer wearing (e.g. higher durometer) material such as a longer wearing rubber than the more forward portions of the outsole. This is advantageous in that more wear typically occurs at the heel of the sole of the article and the tougher outsole material in this area can compensate for that increased wear.

In various preferred aspects, the outsole may be compression molded or blow molded. In preferred aspects, the outsole of the shoe may be made of solid rubber or of blown rubber. The outsole is preferably cemented to the bottom of the midsole block of material.

In preferred aspects, the inner portion of the footwear article defined by the toe piece and the integrally-molded midsole is anatomically contoured to mate with the wearer's foot. This has the advantage of providing a shoe or the like that is less likely to easily slip off of the user's foot.

In preferred aspects, the surface of the article of footwear which contacts the sole of the wearer's foot is constructed to provide a frictional surface under the user's foot. Such frictional surface may be molded into the surface of the midsole or it may be present in the form of an additional added insole layer carrying the frictional surface. For economy of construction it is generally preferred to provide the frictional surface as texture molded into the midsole surface. This texture can take the form of a series of alternate raised and lowered portions under the user's foot. One or more recesses can be provided in the top surface of the midsole and one or more friction-promoting inlays may be received within the recesses, and cemented into to the block of material.

DESCRIPTION OF PREFERRED EMBODIMENTS

Figure 1:
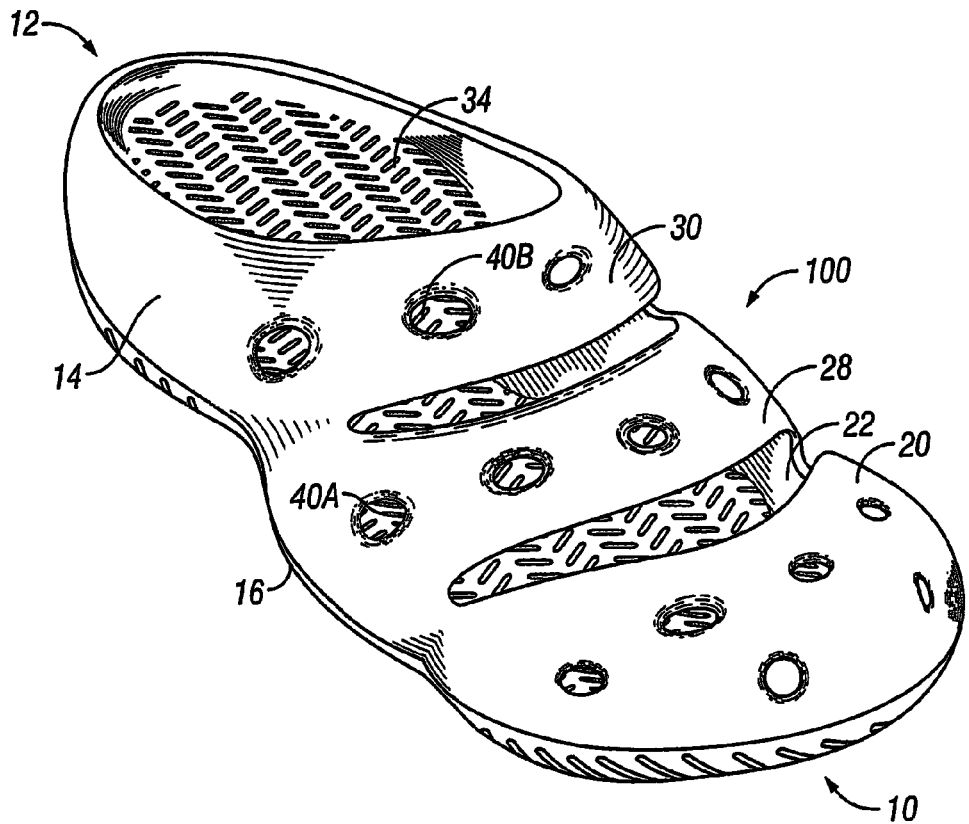
FIG. 1 is a perspective view of a first embodiment of the footwear article.
Figure 2:
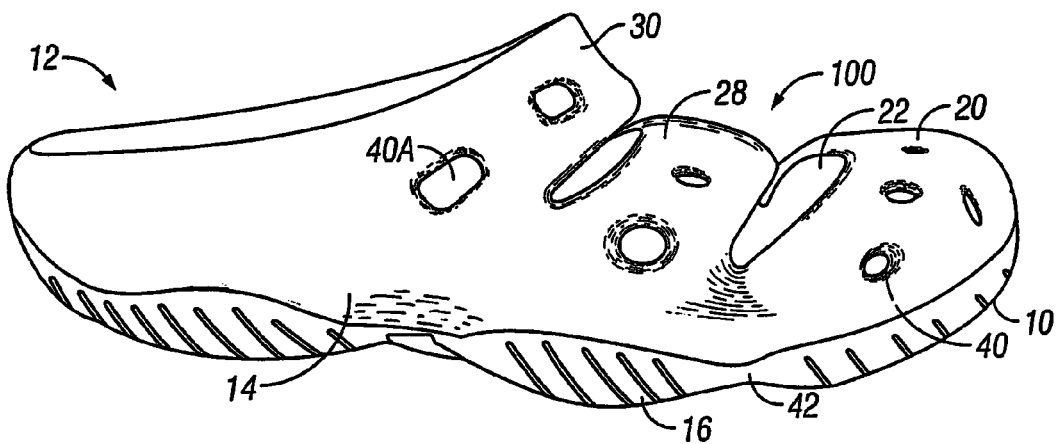
FIG. 2 is a side elevation view of the first embodiment of the article.
Figure 3:
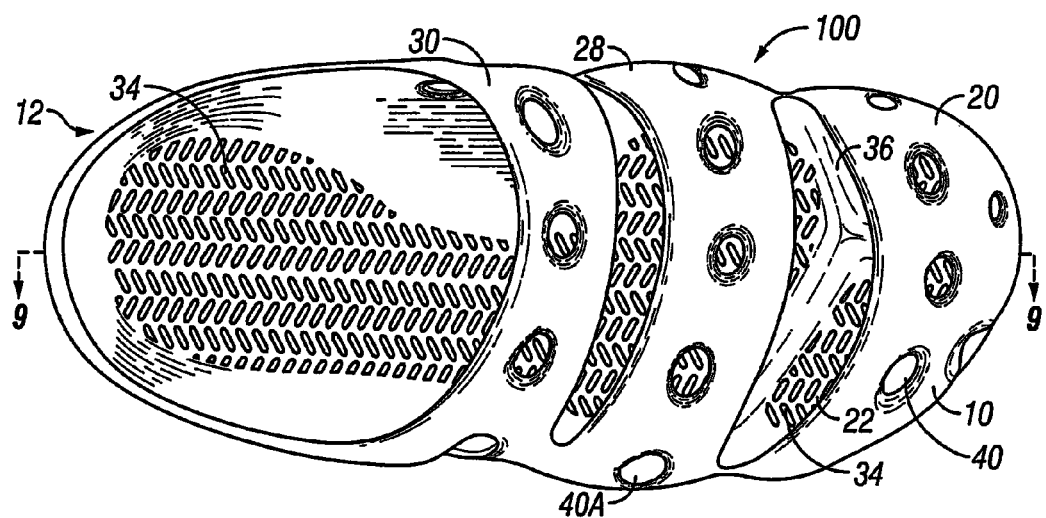
FIG. 3 is a top plan view of the first embodiment of the article.
Figure 4:
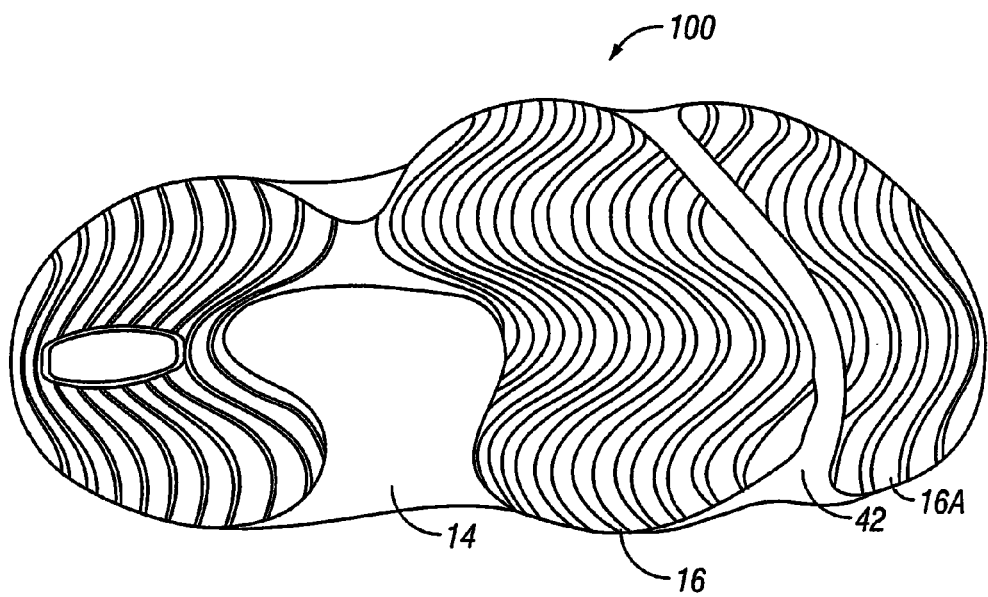
FIG. 4 is a bottom plan view of the first embodiment of the article.
Figure 5:
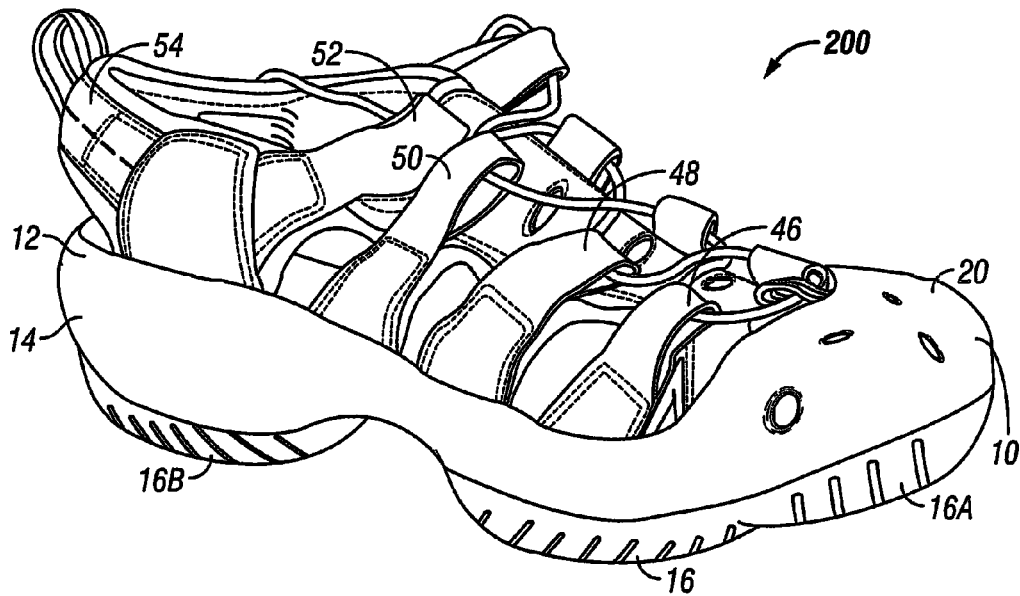
FIG. 5 is a perspective view of a second embodiment of the footwear article.
Figure 6:
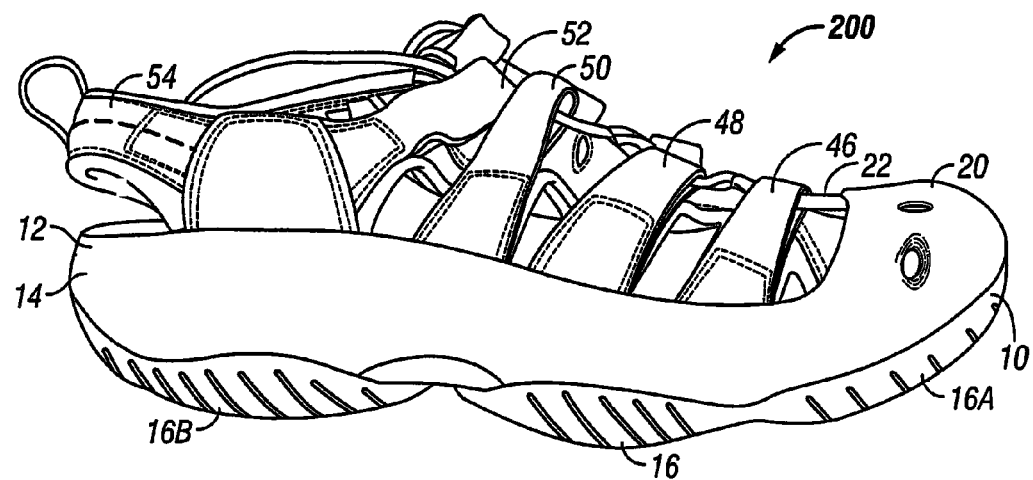
FIG. 6 is a side elevation view of the second embodiment of the article.
Figure 7:
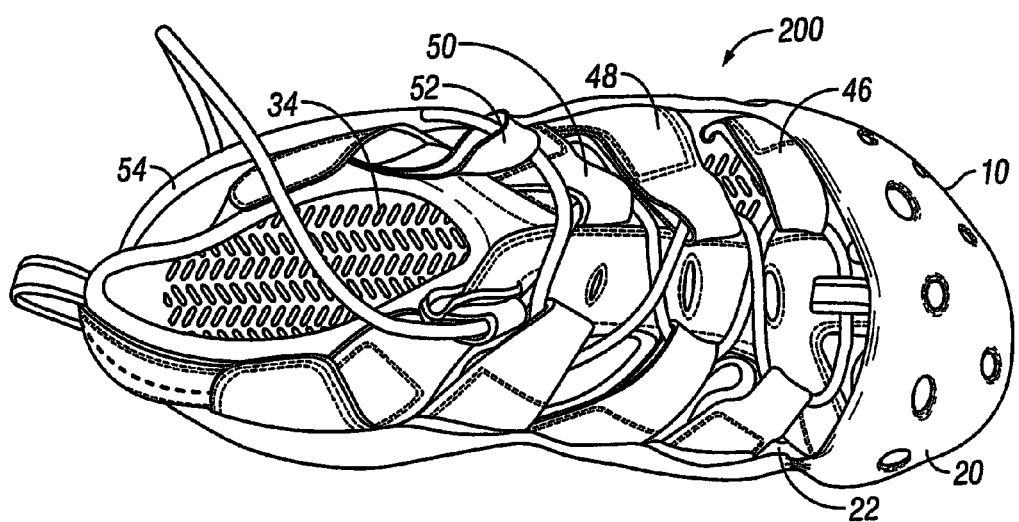
FIG. 7 is a top plan view of the second embodiment of the article.
Figure 8:
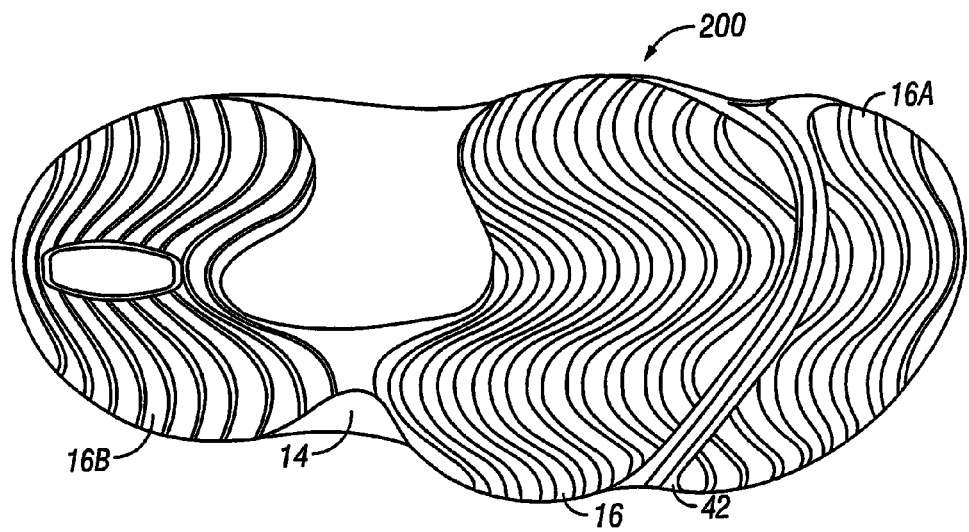
FIG. 8 is a bottom plan view of the second embodiment of the article.
Figure 9:
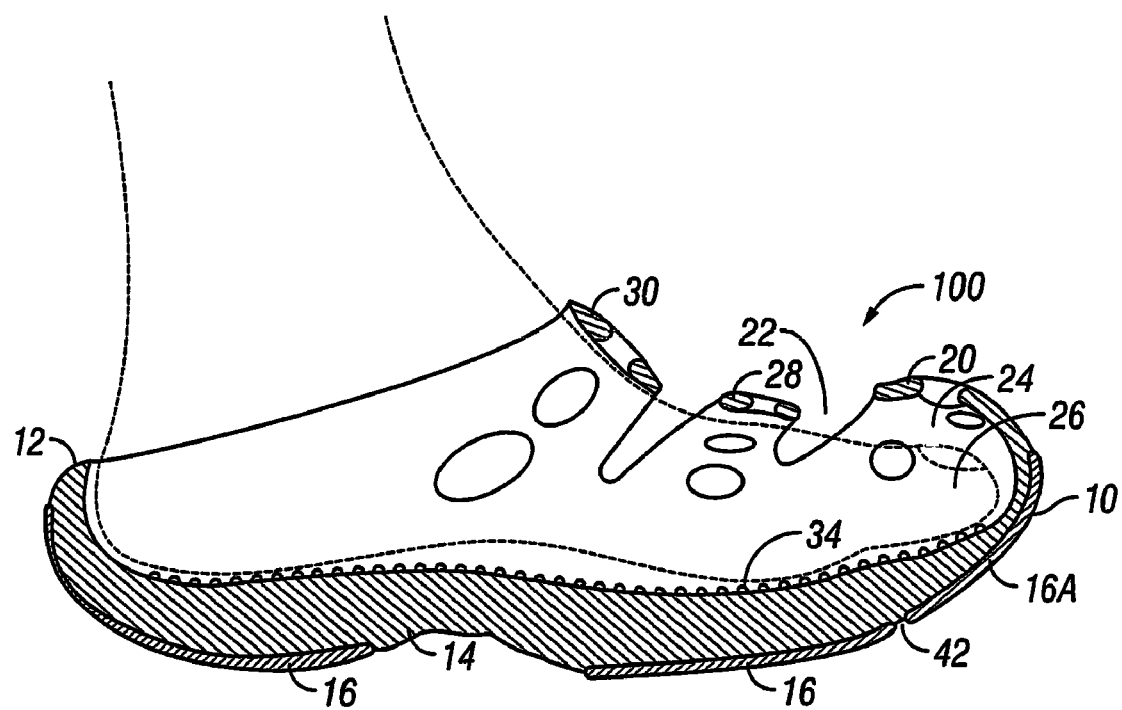
FIG. 9 is a side cross-sectional view of the first embodiment of the article taken along line 9-9' shown in FIG. 3.

Turning to the drawings, an article of footwear 100 is shown in FIG. 1. Article 100 is configured as a clog, having a toe end 10 that engages and surrounds the wearer's foot and a Fig. an heel end 12 that is open for insertion of the wearer's foot there through. Clog 100 is also depicted in FIGS. 2, 3 and 4 and it's cross section is shown in FIG. 9. Clog 100 includes a molded midsole 14 with an outsole 16 attached to it. As depicted most clearly in FIG. 4. in this embodiment, the outsole 16 is actually in multiple sections—a rear or heel section 16 and a front or toe section 16A.

Clog 100 has a toe cap 20 which is integrally molded with midsole 14. Top cap 20 is in one piece with midsole 14 but is separated from the remainder of the clog 100 by a slot 22. Cap 20 extends back from the toe end 12 of the clog a distance approximately equal to the wearer's toes and thus terminates at about the base of the wearer's toes. As shown in FIG. 9, the top surface of midsole 14 and the inside of toe cap 20 define a volume 24 into which the wearers toes 26 can fit. In view of the separation provided by slot 22 the portions of the article of footwear defining this toe area volume are articulated from the remainder of the article as the midsole 14 flexes along a flex line located beneath slot 22.

Clog 100 additionally comprises an upper. In the embodiment shown this upper takes the form of two over-arching bands 28 and 30 which are co-molded with the midsole 14 and toe cap 20 and arch over the wearer's foot when the clog is being warn. As shown in FIG. 9, these bands engage the wearer's foot and hold the clog in place. In view of the space provided by slot 22, the clog can flex substantially, in use, without the rear edge of the toe cap and the upper bands interfering with one another.

The clog can be further held in place by a frictional surface on the surface of the sole which contacts the sole of the wearer's foot. In the embodiment shown this frictional surface takes the form of a series of protrusions 34. It can, in addition, take the form of one or more anatomically shaped ridges, such as ridge 36 (see FIG. 3) positioned on the top surface of the midsole 14 under the slot 22 in a location which will fit under and engage the wearer's toes.

The overall body of clog 100 which includes midsole 14, toe cap 20 and upper bands 28 and 30 is formed in a single molding step from a suitable lightweight elastomeric material such as rubber or moldable polymers. Examples of these materials include foamed polyurethane, foamed natural or synthetic rubber or foamed ethylene vinyl acetate ("EVA") and the like. The body of clog 100 can include one or more holes 40, 40A, 40B, etc. for ventilation and for eye appeal.

In the embodiment 100 shown, outsole 16 is present in two sections. These correspond to opposite sides of a primary flex region 42 in the midsole 14 where the primary bending of the sole takes place when the clog is being worn. Flex zone 42 is located on the underside of the midsole 14 at a position corresponding to the slot 22 between the toe cap 20 and upper strap 28 on the top side of the midsole.

Outsole 16 can be formed of rubber or plastic. Usually, since the outsole contacts the ground in use, it is desirable to form outsole 16 from a durable material. Rubber, both natural and synthetic and both blown and solid rubber can find application in outsole 16. In some embodiments, this outsole can be formed of two or more materials with a harder (higher durometer) material being favored for the high wear areas such as the heel and possibly the tip of the toe area and a less durable, more compliant and comfortable material used for the remainder of the outsole.

Turning to FIGS. 5-8 a second embodiment of the footwear articles provided by this invention is shown, This is sandal 200. Sandal 200 has many of the same components present in just-described clog 100. To emphasize the generality and similarity of these two embodiments, the same numbers will be used for the same parts, where possible. As such, sandal 200 has the same toe end 10 and heel end 12 as well as midsole 16 with co-molded toe cap 20. It has outsole 16 which in this embedment is present in three sections, 16, 16A and 16B. Sandal 200 includes a series of straps 46, 48, 50, 52 and 54. These are in place of bands 28 and 30 in clog 100 and serve the same purpose—to hold the sandal on the wearer's foot. Transverse slot 22 is present between the rear edge of toe cap 20 and the front edge of strap 46. a break 42 is present between outsole section 16 and 16A at a location corresponding to slot 22 to provide a bending zone in the sole structure. Sandal 200 includes the same frictional surface 34 seen in clog 100.

In sandal 200 the straps 46, 48, 50, 52 and 54 are shown made of leather and fabric. Some portion of these straps could be replaced by one or more commonly-molded bands such as bands 28 and/or 30 shown in FIGS. 1-4.

While this invention has been just described with reference to two particular embodiments, a sandal and a clog, it will be readily apparent to those of skill in the art and familiar with footwear designs that this invention could find application in all manner of footwear articles as set forth in the appended claims.

What is claimed is:

1. An article of footwear for a wearer having a one piece molded midsole, the midsole extending from a rear end at a heel of a foot of the wearer to a front end beyond tips of the wearer's toes, comprising:
    a toe cap integrally molded with the midsole, the toe cap extending from the front end of the midsole back over the wearer's toes and terminating in a rear edge at a position adjacent to a base of the wearer's toes;
    a midsole flex line along which the midsole is flexible, the midsole flex line substantially aligned with the rear edge of the toe cap;
    an outsole adhered to a bottom surface of the midsole; and
    an upper adjoined to the midsole to affix the article of footwear to the wearer's foot, the upper including a laced harness.

2. The article of footwear of claim 1 wherein the article is a sandal.

3. The article of footwear of claim 1 wherein the article is a shoe.

4. The article of footwear of claim 1 wherein the molded midsole and toe cap are injection co-molded.

5. The article of footwear of claim 4 wherein the midsole and the toe cap are co-molded of the same moldable plastic.

6. The article of footwear of claim 5 wherein the plastic comprises polyurethane.

7. The article of footwear of claim 5 wherein the plastic comprises ethylene vinyl acetate.

8. The article of footwear of claim 1 wherein the molded midsole, toe cap and upper are injection co-molded.

9. The article of footwear of claim 8 wherein the midsole, toe cap, and upper are co-molded of the same moldable plastic.

10. The article of footwear of claim 9 wherein the plastic comprises polyurethane.

11. The article of footwear of claim 9 wherein the plastic comprises ethylene vinyl acetate.

12. The article of footwear of claim 1, wherein the outsole is cemented to the bottom of the midsole.

13. The article of footwear of claim 12, wherein the outsole is compression molded.

14. The article of footwear of claim 12, wherein the outsole is blow molded.

15. The article of footwear of claim 12, wherein the outsole is made of solid rubber.

16. The article of footwear of claim 12 wherein the outsole is made of blown rubber.

17. The article of footwear of claim 1 wherein the laced harness includes a plurality of straps.

18. The article of footwear of claim 17 wherein the straps are co-molded with the midsole.

19. The article of footwear of claim 17 wherein the straps are made of one or more of leather and fabric.

20. The article of footwear of claim 17 wherein the straps are elastic straps.

21. The article of footwear of claim 1 further comprising a frictional surface between the molded midsole and a sole of the wearer's foot.

22. The article of footwear of claim 21, wherein a top surface of the midsole is textured to provide the frictional surface.

23. The article of footwear of claim 21 additionally comprising an insole intermediate a top surface of the midsole and the sole of the wearer's foot providing the frictional surface.

24. The article of footwear of claim 21 wherein the upper has a front edge, with the toe cap rear edge and the upper front edge being separated from one another by a transverse slot passing across the midsole at a position adjacent to the base of the wearer's toes.

25. The article of footwear of claim 24, wherein the outsole comprises:
    a first portion attached forward of the transverse slot; and
    a second portion attached rearward of the transverse slot.

26. The article of footwear of claim 25, wherein the second portion of the outsole is made of a longer wearing material than the first portion of the outsole.

27. The article of footwear of claim 25, wherein the first and second portions are separate from one another.

28. The article of footwear of claim 25, wherein the outsole further comprises:
    a third portion attached rearward of the second portion.

29. The article of footwear of claim 28, wherein the third portion of the outsole is made of a longer wearing rubber than the first or second portions of the outsole.

30. The article of footwear of claim 24 wherein the frictional surface contains anatomical contours to mate with a shape of the wearer's foot.

31. The article of footwear of claim 30 wherein the anatomical contours comprise a raised transverse ridge located under the transverse slot.

32. The article of footwear of claim 21 wherein the frictional surface contains anatomical contours to mate with a shape of the wearer's foot.

33. The article of footwear of claim 21 wherein the frictional surface is formed of a series of protrusions.

34. The article of footwear of claim 1 wherein the toe cap and portion of the midsole with which it is associated define a toe section of the article of footwear which is articulated from the remainder of the article of footwear along the midsole flex line.

* * * * *